(12) United States Patent
Fukuda

(10) Patent No.: US 11,131,565 B2
(45) Date of Patent: Sep. 28, 2021

(54) MANUFACTURING METHOD OF AN ANNULAR INSERT MOLDED ARTICLE

(71) Applicant: NAKANISHI METAL WORKS CO., LTD., Osaka (JP)

(72) Inventor: Osamu Fukuda, Osaka (JP)

(73) Assignee: NAKANISHI METAL WORKS CO., LTD., Osaka (JP)

( * ) Notice: Subject to any disclaimer, the term of this patent is extended or adjusted under 35 U.S.C. 154(b) by 338 days.

(21) Appl. No.: 15/952,938

(22) Filed: Apr. 13, 2018

(65) Prior Publication Data

US 2018/0231397 A1   Aug. 16, 2018

Related U.S. Application Data

(62) Division of application No. 14/729,497, filed on Jun. 3, 2015, now abandoned.

(30) Foreign Application Priority Data

Jun. 5, 2014   (JP) .................................. 2014-116352
Mar. 17, 2015  (JP) .................................. 2015-053290

(51) Int. Cl.
*G01D 5/20* (2006.01)
*F16C 41/00* (2006.01)
(Continued)

(52) U.S. Cl.
CPC .............. *G01D 5/20* (2013.01); *F16C 41/007* (2013.01); *G01P 3/443* (2013.01);
(Continued)

(58) Field of Classification Search
CPC ........... B29L 2031/752; B29K 2505/12; B29C 45/1459
See application file for complete search history.

(56) References Cited

U.S. PATENT DOCUMENTS

| | | | |
|---|---|---|---|
| 6,602,571 B2 * | 8/2003 | Yamaguchi | G01D 5/244 156/307.1 |
| 7,425,295 B2 * | 9/2008 | Mizuta | B60T 8/329 264/427 |

(Continued)

FOREIGN PATENT DOCUMENTS

| | | | | |
|---|---|---|---|---|
| JP | 2008/233110 | * | 8/2004 | ............. G01D 5/245 |
| JP | 4189696 B2 | | 12/2008 | |
| JP | 2014/173063 | * | 12/2013 | |

OTHER PUBLICATIONS

JP-2008/233,110 (Shigeaki) Aug. 2004 (online machine translation), [Retrieved on Mar. 30, 2020], Retrieved from: Espacenet (Year: 2004).*

(Continued)

*Primary Examiner* — Alison L Hindenlang
*Assistant Examiner* — Andrés E. Behrens, Jr.
(74) *Attorney, Agent, or Firm* — Kratz, Quintos & Hanson, LLP

(57) ABSTRACT

A method of manufacturing an annular insert molded article that suppresses contamination of a metal mold and generation of foreign matter without increase in material costs for an adhesive or contamination of a transfer jig, and has a high adhesion strength so that, when the annular insert molded article is attached to a rotating body, the adhesive does not peel off from the insert or remain as foreign matter in the rotating body.

An annular insert molded article 1 is manufactured by injection molding in a state where a thermoset resin adhesive A is applied to a joining surface of an annular insert 2 attachable to a rotating body to an annular plastic 3 and then the annular insert 2 and the annular plastic 3 are placed in a metal mold.

4 Claims, 10 Drawing Sheets

(a)

(b)

(51) Int. Cl.
*G01P 3/44* (2006.01)
*G01P 3/42* (2006.01)
*F16C 35/00* (2006.01)
*B29K 77/00* (2006.01)
*B29K 81/00* (2006.01)
*B29K 105/16* (2006.01)
*B29K 63/00* (2006.01)
*B29K 505/12* (2006.01)
*B29L 31/00* (2006.01)
*B29C 45/14* (2006.01)
*F16C 19/18* (2006.01)
*F16C 33/72* (2006.01)

(52) U.S. Cl.
CPC ..... *B29C 45/1459* (2013.01); *B29C 45/14311* (2013.01); *B29K 2063/00* (2013.01); *B29K 2077/00* (2013.01); *B29K 2081/04* (2013.01); *B29K 2105/16* (2013.01); *B29K 2505/12* (2013.01); *B29K 2995/0008* (2013.01); *B29L 2031/752* (2013.01); *F16C 19/186* (2013.01); *F16C 33/723* (2013.01); *F16C 2326/02* (2013.01); *Y10T 428/218* (2015.01)

(56) References Cited

U.S. PATENT DOCUMENTS

| | | | |
|---|---|---|---|
| 7,800,361 | B2 | 9/2010 | Tomioka |
| 7,812,599 | B2 | 10/2010 | Ishii et al. |
| 8,828,178 | B2 * | 9/2014 | Yamamoto ............ F16C 41/007 156/281 |
| 2008/0218161 | A1 * | 9/2008 | Ishii ........................ G01P 3/487 324/207.25 |
| 2009/0009161 | A1 | 1/2009 | Shiotsuka et al. |
| 2009/0058403 | A1 * | 3/2009 | Tomioka ................. F16J 15/326 324/207.25 |
| 2010/0007450 | A1 | 1/2010 | Mizuta |
| 2010/0245006 | A1 * | 9/2010 | Menjo .................... H01F 1/0558 335/302 |
| 2011/0068781 | A1 | 3/2011 | Yamaguchi |
| 2013/0333838 | A1 * | 12/2013 | Plaut .......................... C09J 7/35 156/307.1 |
| 2015/0354988 | A1 * | 12/2015 | Fukuda ................. F16C 41/007 324/207.25 |
| 2015/0354989 | A1 * | 12/2015 | Taki ........................ G01P 3/443 324/207.25 |
| 2016/0033303 | A1 * | 2/2016 | Harano .................... G01D 5/12 324/207.25 |
| 2016/0083626 | A1 * | 3/2016 | Ebe ........................ G06F 3/046 324/207.17 |
| 2016/0346975 | A1 * | 12/2016 | Kamiji ................ B29C 45/0025 |

OTHER PUBLICATIONS

"Epoxy." Wikipedia, Wikimedia Foundation, May 19, 2015, web. archive.org/web/20150519035521/en.wikipedia.org/wiki/Epoxy#Curing_epoxy_resins. (Year: 2015).*

JP-2014/173,063(Fujiura) Dec. 1993 (online machine translation), [Retrieved on Sep. 28, 2020], Retrieved from: Espacenet (Year: 2013).*

* cited by examiner

[Fig. 1]
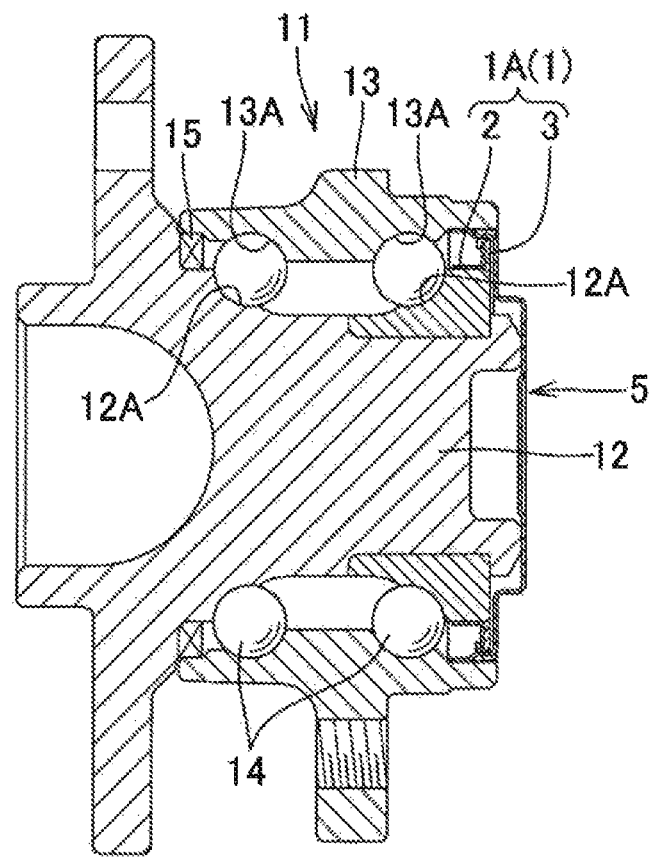

[Fig. 2]
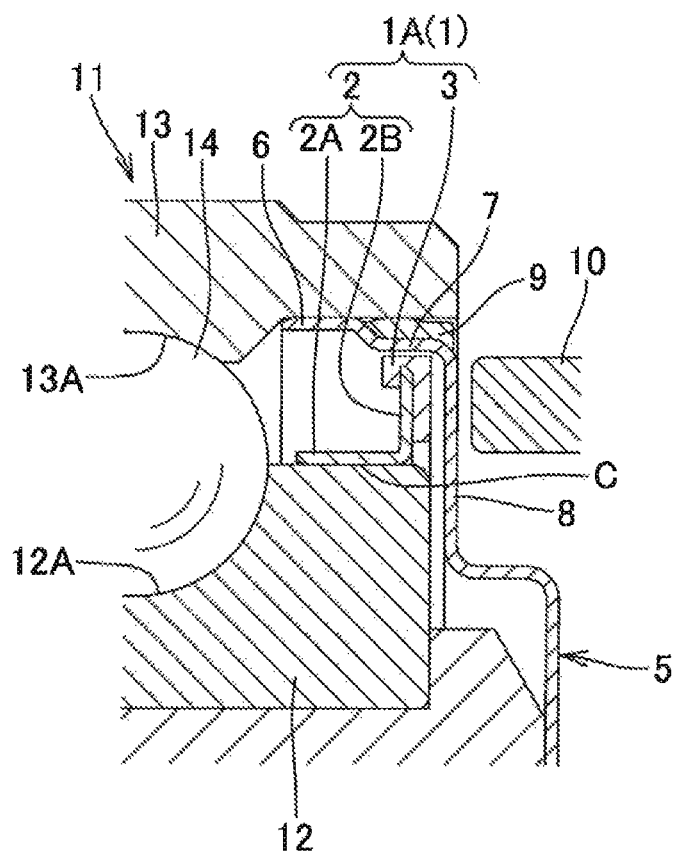

[Fig. 3]
(a)
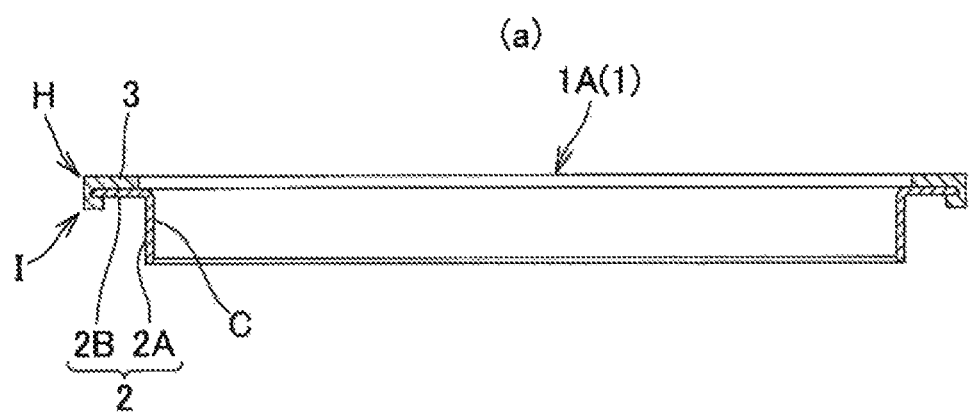
(b)
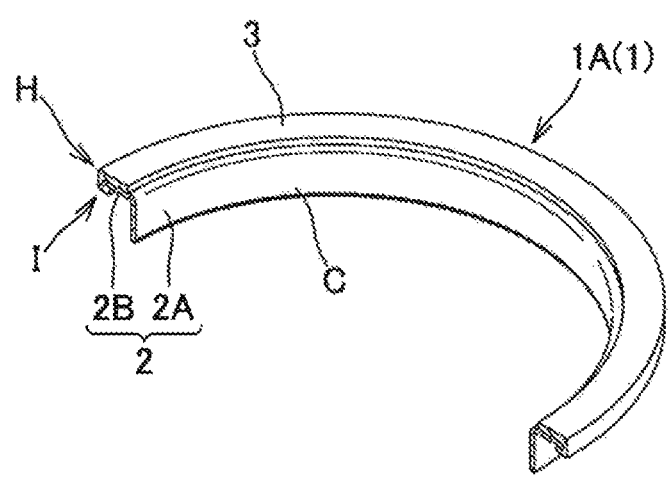

[Fig. 4]
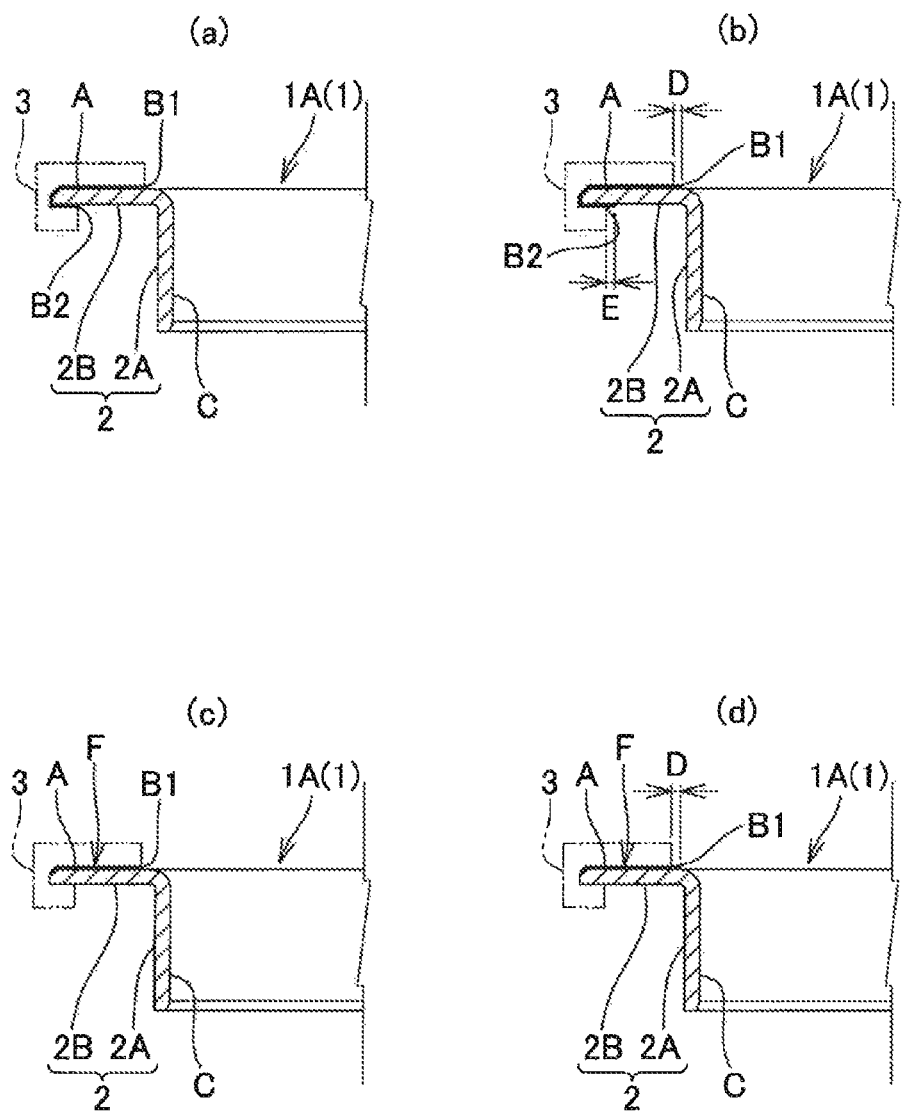

[Fig. 5]
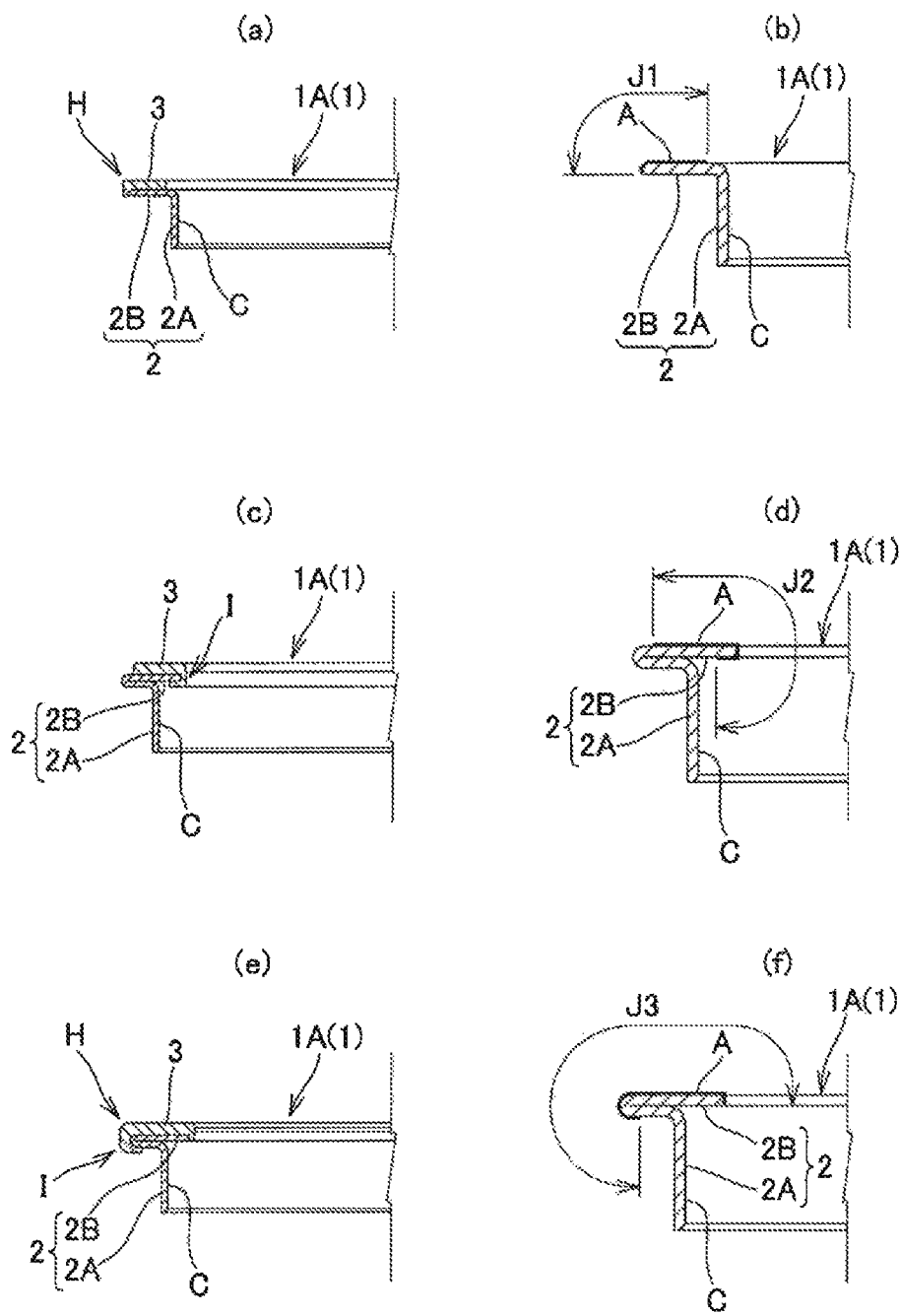

[Fig. 6]
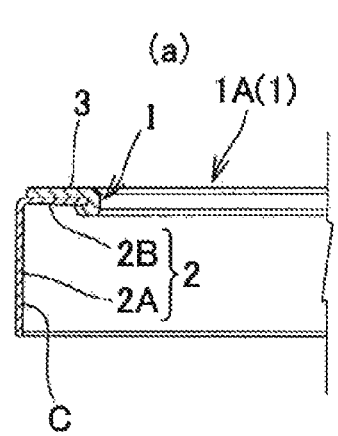
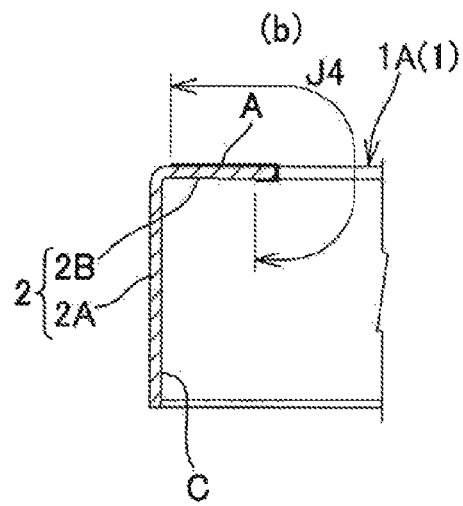
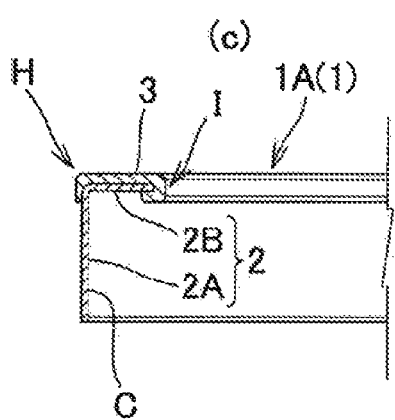
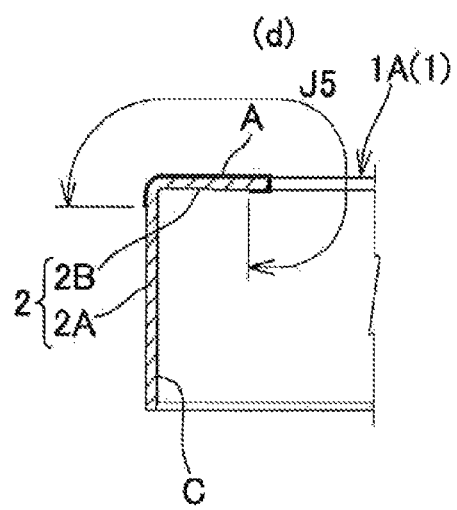

[Fig. 7]
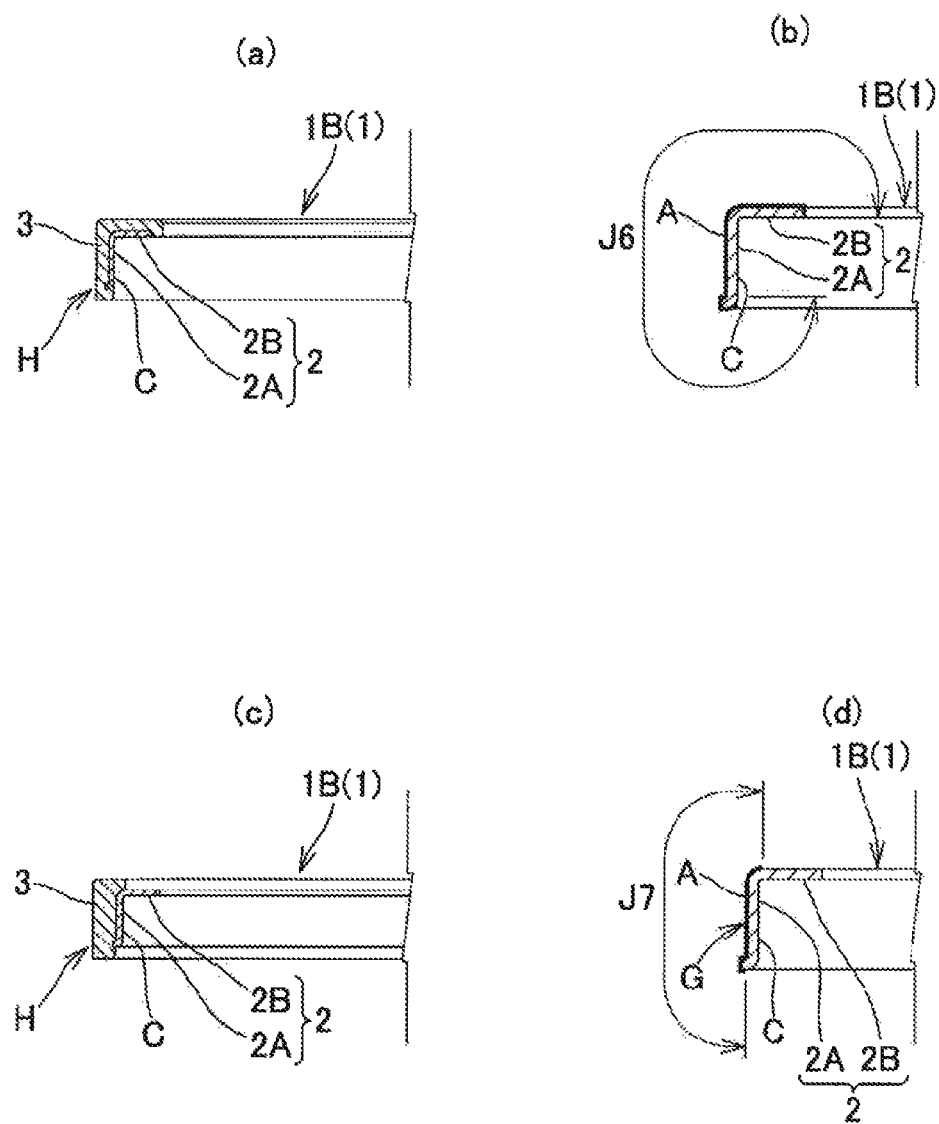

[Fig. 8]
(a)
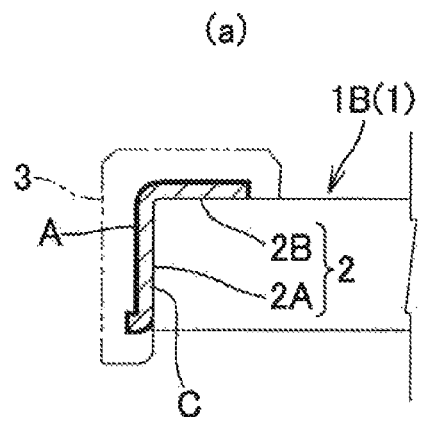
(b)
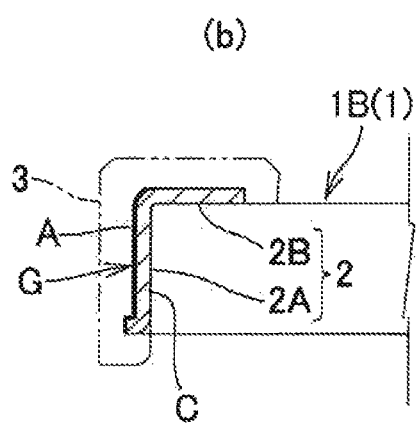

[Fig. 9]
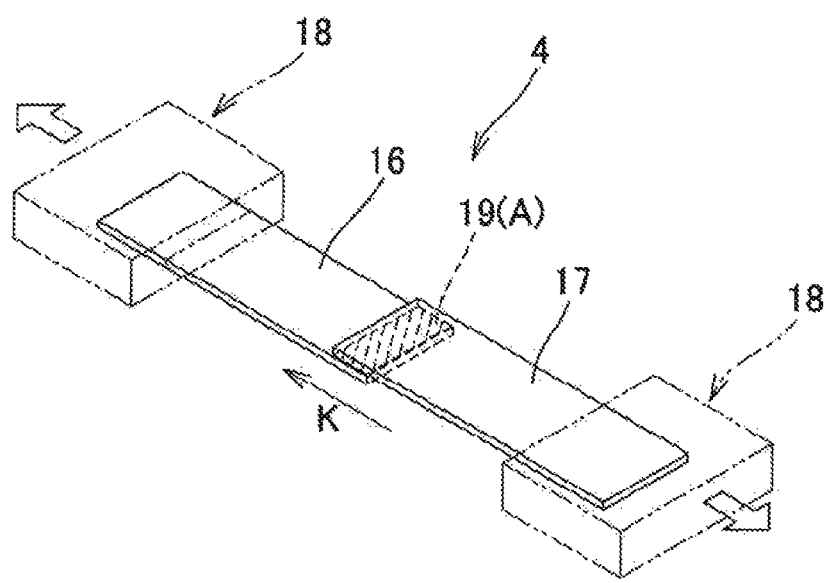

[Fig. 10]
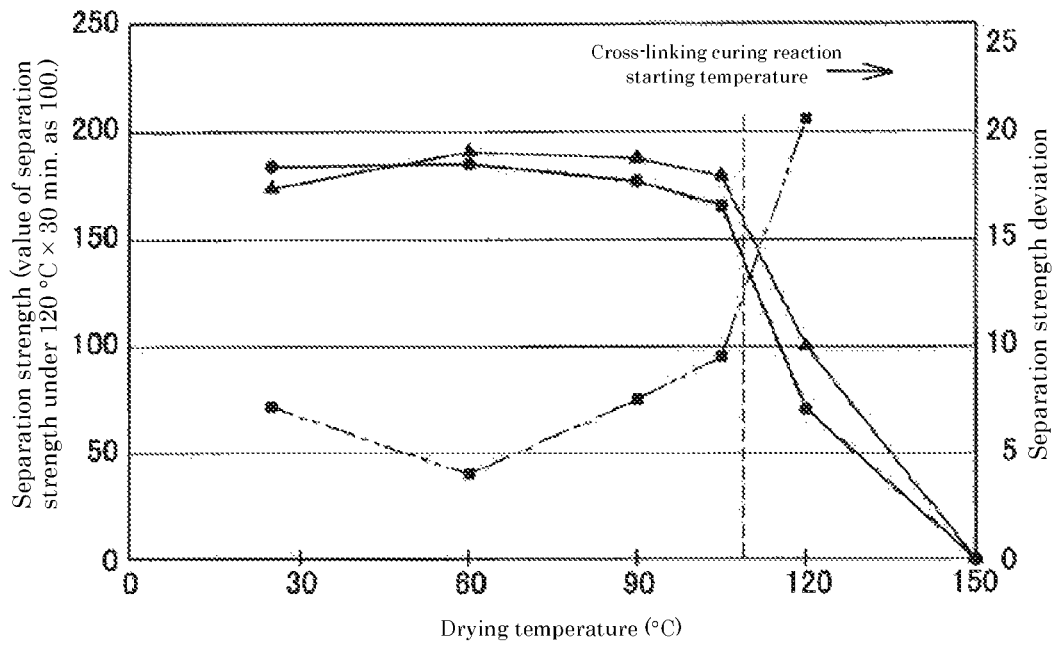

MANUFACTURING METHOD OF AN ANNULAR INSERT MOLDED ARTICLE

CROSS-REFERENCE TO RELATED APPLICATIONS

This application is a Divisional Application of U.S. application Ser. No. 14/729,497, filed Jun. 3, 2015, which claims the benefit under 35 U.S.C. § 119(b) of Japanese Patent Application No. JP 2015-053290 filed Mar. 17, 2015, and Japanese Patent Application No. JP 2014-116352 filed Jun. 5, 2014, the entire contents of each of which are incorporated herein by reference.

TECHNICAL FIELD

The present invention relates to an annular insert molded article that is manufactured by injection molding in a state where a thermoset resin adhesive is applied to a joining surface of an annular insert to an annular plastic, and a manufacturing method thereof.

BACKGROUND ART

As an annular insert molded article that is manufactured by injection molding in a state where a thermoset resin adhesive is applied to a joining surface of an annular component formed from a steel plate as an insert to an annular plastic and then the insert and the plastic are placed in a metal mold, for example, there is a magnetic encoder made from a plastic magnet used in a rotation speed detection device for a rotating body (for example, refer to Patent Document 1).

Such a magnetic encoder includes a fixed member (slinger 25, 33, 60 described in Patent Document 1) attachable to a rotating body and a plastic magnet (magnetic pole forming ring 27, 34, 70 described in Patent Document 1) that is attached to the fixed member and circumferentially magnetized in a multipolar manner, and the fixed member and the plastic magnet are usually fixed to each other with an adhesive.

To apply the adhesive to the insert (slinger) at the time of manufacture of the magnetic encoder, in general, the adhesive is solved in a solvent and stored in a liquid state in a bath, and then the insert is soaked in the liquid adhesive to allow simultaneous processing of a large number of inserts (for example, refer to Patent Document 1, paragraph [0094]).

According to the manufacturing method of a magnetic encoder described in Patent Document 1, after the adhesive application step in which the insert is soaked in the liquid adhesive to apply the adhesive to the insert as described above, the following steps are performed: an adhesive drying step in which the adhesive is dried to drive off the solvent; a primary heating step in which the adhesive is heated and baked into a semi-cured state; an injection molding step in which the insert is set in a metal mold and a dissolved plastic magnet material is injected into the metal mold to shape the magnetic encoder; and a secondary heating step in which the adhesive is fully cured (for example, refer to Patent Document 1, paragraph [0094]).

CITATION LIST

Patent Literatures

Patent Document 1: Japanese Patent No. 4189696

SUMMARY OF INVENTION

Technical Problem

In the manufacturing method of an annular insert molded article (magnetic encoder) as described in Patent Document 1, the insert (slinger) is soaked in the liquid adhesive in the adhesive application step. This method allows a large number of inserts to be processed, but the adhesive is applied to the entire insert including unnecessary portions.

Accordingly, there arise problems (1) to (4) as follows:

(1) When the insert having undergone the adhesive drying step is transferred by automated machinery, the adhesive may stick to a transfer jig and contaminate the same.

(2) When the insert is set in a metal mold or the injection molding step is performed, the adhesive may stick to the metal mold and contaminate the same or cause foreign matter on the metal mold.

(3) Since the adhesive is applied to the entire insert including a surface to be in contact with the metal mold in the injection molding step, when the insert is set in the metal mold, the insert and the metal mold adhere firmly to each other, and the product is hard to separate from the metal mold, which may cause the molding step to be stopped.

(4) When the annular insert molded article is attached to a rotating body such as a bearing, the adhesive may peel off from the insert and remain as foreign matter in the rotating body.

To solve the foregoing problems, according to the manufacturing method described in Patent Document 1, it is essential to, after the adhesive drying step, heat and bake the adhesive into a semi-cured state, that is, perform the primary heating step involving a cross-linking curing reaction.

However, baking the adhesive into a semi-cured state decreases the reactive groups in the adhesive to be linked with the dissolved plastic magnet material in the injection molding step, thereby causing a problem of a lowered binding force between the insert (slinger) and the plastic (plastic magnet).

In particular, if the heating temperature is raised in the primary heating step for promoting a cross-linking curing reaction to suppress the contamination of the metal mold in (2) and the firm adhesion between the insert and the metal mold in (3), the binding force between the insert (slinger) and the plastic (plastic magnet) become significantly lower.

In light of the foregoing circumstances, an object of the present invention is to provide an annular insert molded article that does not contaminate a transfer jig when an insert having undergone an adhesive drying step is transferred by automated machinery, prevents contamination of a metal mold and generation of foreign matter when the insert is set in the metal mold or an injection molding step is performed, suppresses reduction in productivity resulting from adhesion between the insert and the metal mold, and has a high adhesion strength so that, when the annular insert molded article is attached to a rotating body, the adhesive does not peel off from the insert or remain as foreign matter in the rotating body, and a manufacturing method thereof.

Solution to Problem

To solve the foregoing problems, an annular insert molded article according to the present invention is an annular insert molded article manufactured by injection molding in a state where a thermoset resin adhesive is applied to a joining surface of an annular insert attachable to a rotating body to an annular plastic and then the annular insert and the annular plastic are placed in a metal mold, wherein the range of the adhesive applied to the annular insert is a range not going beyond a boundary with the annular plastic by more than 3 mm, and the range does not include a portion of the annular insert to be fitted with the rotating body (claim 1).

According to this configuration, the application range of the adhesive to the annular insert does not go beyond the boundary with the annular plastic by more than 3 mm, which makes it possible to suppress contamination of a transfer jig by the adhesive when the insert having undergone an adhesive drying step is transferred by automated machinery, and suppress contamination of a metal mold and generation of foreign matter caused by the adhesive when the insert is set in the metal mold or the injection molding step is performed.

In addition, the application range of the adhesive to the annular insert does not go beyond the boundary with the annular plastic by more than 3 mm, and thus the adhesive is applied to a small region of the insert to be in contact with the metal mold in the injection molding step, which brings about light adhesion between the insert and the metal mold, even though a primary heating step in which to heat and bake the adhesive into a semi-cured state is not performed before the injection molding step. Therefore, the insert molded article is not hard to separate from the metal mold, without reduction in productivity.

Further, the application range of the adhesive to the annular insert does not include the portion of the annular insert to be fitted with the rotating body, and therefore when the annular insert molded article is attached to the rotating body, the adhesive does not peel off from the annular insert or remain as foreign matter in the rotating body.

Moreover, the application range of the adhesive to the annular insert does not go beyond the boundary with the annular plastic by more than 3 mm, and therefore a smaller amount of the adhesive is applied to unnecessary portions to reduce waste of adhesive to an extremely amount, thereby retarding increase of material costs for the adhesive.

It is preferred that the annular insert molded article is an axial-type magnetic encoder that has the annular insert as a fixed member and the annular plastic as a plastic magnet, and the adhesive is applied only to an axially opposed surface of the fixed member (claim 2).

According to this configuration, the adhesive is applied only to the axially opposed surface of the fixed member in the axial-type magnetic encoder, which improves workability and productivity of the adhesive application step because of one-direction application of the adhesive and allows the plastic magnet with magnetic poles formed along the axially opposed surface of the fixed member to adhere effectively to the fixed member.

It is preferred that the annular insert molded article is a radial-type magnetic encoder that has the annular insert as a fixed member and the annular plastic as a plastic magnet, and the adhesive is applied only to a radially opposed surface of the fixed member (claim 3).

According to this configuration, the adhesive is applied only to the radially opposed surface of the fixed member in the radial-type magnetic encoder, which improves workability and productivity of the adhesive application step because of one-direction application of the adhesive and allows the plastic magnet with magnetic poles formed along the radially opposed surface of the fixed member to adhere effectively to the fixed member.

To solve the foregoing problems, a manufacturing method of an annular insert molded article according to the present invention is a manufacturing method of an annular insert molded article, including: an adhesive application step of applying a thermoset resin adhesive to a joining surface of an annular insert attachable to a rotating body to an annular plastic; and an injection molding step of injecting a dissolved plastic material into a metal mold in which the annular insert having undergone the adhesive application step is placed, wherein, in the adhesive application step, the adhesive is applied to the annular insert only in a range not going beyond a boundary with the annular plastic by more than 3 mm, and the adhesive is not applied to a portion of the annular insert to be fitted with the rotating body (claim 4).

According to this manufacturing method, the application range of the adhesive to the annular insert does not go beyond the boundary with the annular plastic by more than 3 mm in the adhesive application step, which makes it possible to suppress contamination of a transfer jig by the adhesive when the insert having undergone an adhesive drying step is transferred by automated machinery, and suppress contamination of a metal mold and generation of foreign matter caused by the adhesive when the insert is set in the metal mold or the injection molding step is performed.

In addition, even though a primary heating step in which to heat and bake the adhesive into a semi-cured state is not performed before the injection molding step, the application range of the adhesive to the annular insert does not go beyond the boundary with the annular plastic by more than 3 mm, and thus the adhesive is applied to a small region of the insert to be in contact with the metal mold in the injection molding step, which brings about light adhesion between the insert and the metal mold. Therefore, the insert molded article is not hard to separate from the metal mold, without reduction in productivity.

Further, the portion of the annular insert to be fitted with the rotating body is not included in the application range of the adhesive to the annular insert, and when the annular insert molded article is attached to the rotating body, the adhesive does not peel off from the annular insert or remain as foreign matter in the rotating body.

Moreover, the application range of the adhesive to the annular insert does not go beyond the boundary with the annular plastic by more than 3 mm, and therefore a smaller amount of the adhesive is applied to unnecessary portions to reduce waste of adhesive to an extremely amount, thereby retarding increase of material costs for the adhesive.

It is preferred that the annular insert molded article is an axial-type magnetic encoder that has the annular insert as a fixed member and the annular plastic as a plastic magnet, and the adhesive is applied only to an axially opposed surface of the fixed member in the adhesive application step.

According to this manufacturing method, the adhesive is applied only to the axially opposed surface of the fixed member in the axial-type magnetic encoder in the adhesive application step, which improves workability and productivity of the adhesive application step because of one-direction application of the adhesive and allows the plastic magnet with magnetic poles formed along the axially opposed surface of the fixed member to adhere effectively to the fixed member.

It is also preferred that the annular insert molded article is a radial-type magnetic encoder that has the annular insert as a fixed member and the annular plastic as a plastic magnet, and the adhesive is applied only to a radially opposed surface of the fixed member in the adhesive application step.

According to this manufacturing method, the adhesive is applied only to the radially opposed surface of the fixed member in the radial-type magnetic encoder in the adhesive application step, which improves workability and productivity of the adhesive application step because of one-direction application of the adhesive and allows the plastic magnet with magnetic poles formed along the radially opposed surface of the fixed member to adhere effectively to the fixed member.

It is also preferred that the adhesive is applied to the annular insert in the adhesive application step by a pad printing process in which a pad as a transfer body with the adhesive in a predetermined region is pressed to transfer the adhesive to the annular insert, or by a screen printing process in which the adhesive is placed on a screen printing plate with pores in a predetermined range and is extruded from the pores to transfer the adhesive to the annular insert, or by a brushing process.

According to this manufacturing method, the application of the adhesive in the adhesive application step can be performed in a stable and reliable manner such that the thermoset resin adhesive is applied to the annular insert only in the range not going beyond a boundary with the annular plastic by more than 3 mm and the adhesive is not applied to a portion of the annular insert to be fitted with the rotating body.

It is also preferred that the manufacturing method includes a drying and solidification step of volatilizing a solvent included in the adhesive under a temperature condition at a temperature lower than a cross-linking reaction starting temperature of the adhesive to dry and solidify the adhesive between the adhesive application step and the injection molding step, and the manufacturing method does not include a heating step of heating the adhesive at a temperature equal to or higher than the cross-linking reaction starting temperature of the adhesive to bake the adhesive onto the annular insert.

According to this manufacturing method, no heating step of heating the adhesive at a temperature equal to or higher than the cross-linking reaction starting temperature of the thermoset resin adhesive to bake the adhesive onto the annular insert is performed between the adhesive application step and the injection molding step, and thus the reactive groups in the adhesive to be linked with the dissolved plastic material does not decrease in the injection molding step, and the binding force between the annular insert and the annular plastic does not decline. Therefore, the adhesion strength of the adhesive becomes higher.

Advantageous Effects of Invention

According to the annular insert molded article and the manufacturing method thereof according to the present invention as described above, the following significant advantages can be produced:

(A) The application range of the adhesive to the annular insert does not go beyond the boundary with the annular plastic by more than 3 mm, which makes it possible to suppress contamination of a transfer jig by the adhesive when the insert having undergone an adhesive drying step is transferred by automated machinery, and suppress contamination of a metal mold and generation of foreign matter caused by the adhesive when the insert is set in the metal mold or the injection molding step is performed.

(B) The application range of the adhesive to the annular insert does not go beyond the boundary with the annular plastic by more than 3 mm, and thus the adhesive is applied to a small region of the insert to be in contact with the metal mold in the injection molding step, which brings about light adhesion between the insert and the metal mold, even though a primary heating step in which to heat and bake the adhesive into a semi-cured state is not performed before the injection molding step. Therefore, the insert molded article is not hard to separate from the metal mold, without reduction in productivity.

(C) The application range of the adhesive to the annular insert does not include the portion of the annular insert to be fitted with the rotating body, and therefore when the annular insert molded article is attached to the rotating body, the adhesive does not peel off from the annular insert or remain as foreign matter in the rotating body.

(D) The adhesive is applied to the annular insert by a pad printing process, a screen printing process, or a brushing process, which allows the application of the adhesive only to a predetermined application range in a stable and reliable manner.

(E) According to the manufacturing method with no heating step of heating the adhesive at a temperature equal to or higher than the cross-linking reaction starting temperature of the adhesive to bake the adhesive onto the annular insert between the adhesive application step and the injection molding step, the reactive groups in the adhesive to be linked with the dissolved plastic material does not decrease in the injection molding step, and the binding force between the annular insert and the annular plastic does not decline. Therefore, the adhesion strength of the adhesive becomes higher.

(F) The application range of the thermoset resin adhesive to the annular insert does not go beyond the boundary with the annular plastic by more than 3 mm, and therefore a smaller amount of the adhesive is applied to unnecessary portions to reduce waste of adhesive to an extremely amount, thereby retarding increase of material costs for the adhesive.

BRIEF DESCRIPTION OF DRAWINGS

FIG. 1 is a vertical cross-sectional view of an example of a bearing device including an annular insert molded article (axial-type magnetic encoder) according to an embodiment of the present invention;

FIG. 2 is an enlarged vertical cross-sectional view of major components of the same;

FIG. 3 shows the annular insert molded article (axial-type magnetic encoder) according to the embodiment of the present invention: FIG. 3(a) is a vertical cross-sectional view and FIG. 3(b) is a partial vertical cross-sectional view;

FIG. 4 includes enlarged vertical cross-sectional views of major components, showing examples of application ranges of an adhesive to an annular fixed member;

FIG. 5 includes enlarged vertical cross-sectional views of major components, showing variations of joining forms of the annular fixed member and an annular plastic magnet and application ranges of the adhesive;

FIG. 6 includes enlarged vertical cross-sectional views of major components, showing variations of the same and application ranges of the adhesive;

FIG. 7 includes enlarged vertical cross-sectional views of major components, showing variations of joining forms of an annular fixed member and an annular plastic magnet in an annular insert molded article (radial-type magnetic encoder) and application ranges of an adhesive;

FIG. 8 includes vertical cross-sectional views of examples of application ranges of the adhesive to the annular fixed member;

FIG. 9 is a schematic perspective view of a dumbbell specimen for evaluation of adhesion strength produced in a test example; and FIG. 10 is a graph showing the relationship between drying temperature and separation strength of the dumbbell specimen for evaluation of adhesion strength in the test example.

DESCRIPTION OF EMBODIMENTS

Embodiments of the present invention will now be described below with reference to the accompanying drawings. The present invention is not limited to the embodiments shown in the drawings but includes all of embodiments meeting the requirements described in the patent claims.

As shown in the vertical cross-sectional view of FIG. 1 and the enlarged vertical cross-sectional view of major components of FIG. 2, a bearing device 11 including an axial-type magnetic encoder 1A as an annular insert molded article 1 according to an embodiment of the present invention includes: an inner ring 12 that has an inner ring track surface 12A on an outer peripheral surface; an outer ring 13 that has an outer ring track surface 13A on an inner peripheral surface; a bearing that has rolling elements 14, 14, . . . rolling between the inner ring track surface 12A and the outer ring track surface 13A and the like; the magnetic encoder 1A that is positioned at one axial end part of the bearing and is fixed to the inner ring 12; a sensor 10 that is fixed to the outer ring 13 and opposed to the magnetic pole of the magnetic encoder 1A to detect the rotation of the magnetic encoder 1A; a cup-shaped protective cover 5 that is press-fitted into the outer ring 13 to cover the magnetic encoder 1A and intervenes between the magnetic encoder 1A and the sensor 10; and a seal member 15 that is arranged at the other axial end part of the bearing, and the like.

In this configuration, a rotating speed detection device is formed by the magnetic encoder 1A that is attached to the inner ring 12 at the rotary side and has N and S poles circumferentially magnetized at regular intervals in a multipolar manner and the sensor 10 that is attached to the outer ring 13 at the fixed side.

The interior of the bearing is sealed by the protective cover 5 and the seal member 15 at the both axial end parts of the bearing, and the magnetic encoder 1A is stored in the interior space. This makes it possible to protect the magnetic encoder 1A and the bearing interior from foreign matter and the like.

As shown in FIG. 2, the protective cover 5 is composed of a first cylindrical part 6 that is press-fitted into the outer ring 13; a second cylindrical part 7 that is smaller in diameter than the first cylindrical part 6 and is connected to the end edge of the first cylindrical part 6; an annular part 8 that is connected to the end edge of the second cylindrical part 7 and is extended radially inward; and a seal body 9 that is vulcanized and adhered to the outer peripheral surface of the second cylindrical part 7 and the like. All of the components except for the seal body 9 are formed by pressing stainless-steel plates.

In addition, the seal body 9 is an elastic body such as synthetic rubber and thus can improve airtightness between the protective cover 5 and the outer ring 13. The seal body 9 can be used as an appropriate blend of one or two or more kinds of rubbers from rubber materials with favorable oil resistance such as nitrile rubber (NBR), hydrogenated nitrile rubber (HNBR), acrylic rubber (ACM), ethylene-acrylic rubber (AEM), fluoro rubber (FKM, FPM), and silicon rubber (VQM).

According to the configuration of the bearing device 11 including the protective cover 5 as described above, the magnetic encoder 1A is covered by the protective cover 5 press-fitted into the outer ring 13, which makes it possible to suppress breakage and changes in magnetic characteristics of the magnetic encoder 1A. In addition, the protective cover 5 is provided instead of a seal member (for example, refer to the elastic material 22b as a seal lip described in Patent Document 1), which makes it possible to reduce rotary torque of the bearing device 11.

As shown in the vertical cross-sectional view of FIG. 3(a), the partial perspective vertical cross-sectional view of FIG. 3(b), and the enlarged vertical cross-sectional view of major components of FIG. 4, the magnetic encoder 1A is composed of an annular fixed member 2 as an annular insert attachable to the inner ring 12 as a rotating body (refer to FIGS. 1 and 2) and an annular plastic magnet 3 as an annular plastic attached to the annular fixed member 2.

In this configuration, the annular fixed member 2 is composed of a cylindrical part 2A and a flange part 2B extended radially outward from the end edge of the cylindrical part 2A, and is formed by pressing a stainless-steel plate.

Injection molding is performed in a state where a thermoset resin adhesive A is applied to a predetermined portion on a joining surface of the annular fixed member 2 to the annular plastic magnet 3 and then the annular fixed member 2 and the annular plastic magnet 3 are placed in a metal mold, thereby to form the magnetic encoder 1A as the annular insert molded article 1.

The adhesive A intervenes between the annular fixed member 2 and the annular plastic magnet 3 as shown in FIG. 4, and the annular plastic magnet 3 has a joint portion H resulting from molding shrinkage and a wrap-around joint portion I as shown in FIG. 3, whereby the annular fixed member 2 and the annular plastic magnet 3 are joined and integrated.

There is no particular limitation on thickness of the adhesive A. For example, the adhesive has preferably a thickness of 2 to 20 μm which allows adhesion strength to be kept even if the magnetic encoder is rotated under severe environments.

The annular plastic magnet 3 is made of a magnet material containing magnetic substance powder, a binder, and an additive.

The magnetic substance powder is preferably ferrite-based magnetic powder such as strontium ferrite or barium ferrite, or rare-earth magnetic powder such as neodymium- or samarium-based magnetic powder.

The binder is preferably a thermoplastic resin material such as a polyamide (PA6, PA12, PA612, or the like) or polyphenylene sulfide (PPS).

The additive is preferably an organic additive such as carbon fiber, or an inorganic additive such as glass beads, glass fiber, talc, mica, silicon nitride (ceramic), or crystalline (or non-crystalline) silica.

By changing the kind and mixture ratio of the additive, it is possible to adjust the annular plastic magnet 3 to reduce its linear expansion coefficient and increase its strength.

The thermoset resin adhesive A may be an adhesive used in general magnetic encoders, for example, a phenol resin adhesive, an epoxy resin adhesive, or the like, for example.

The phenol resin adhesive may be a rubber vulcanizing adhesive. Although there is no particular limitation on the chemical composition of the phenol resin adhesive, a novolac-type phenolic resin or a resol-type phenolic resin and a curing agent such as hexamethylenetetramine may be dissolved in methanol or methyl ethyl ketone. In addition, to obtain higher adhesiveness, a novolac-type epoxy resin may be mixed into these substances.

The epoxy resin adhesive may be a one-component epoxy adhesive as a liquid concentrate that can be diluted into a solvent. The one-component epoxy adhesive is composed of at least an epoxy resin and a curing agent. As necessary, the one-component epoxy adhesive may be mixed with another epoxy compound used as a reactive diluent, curing accelerator for improvement of thermal curing rate, inorganic filler effective in improvement of heat resistance and curing strain resistance, cross-linked rubber particles for improvement of flexibility causing deformation under pressure, and the like.

The epoxy resin may be any of copolymers with other polymers such as a bisphenol A epoxy resin, a bisphenol F epoxy resin, a bisphenol AD epoxy resin, a naphthalene epoxy resin, a biphenyl epoxy resin, a glycidyl amine epoxy resin, an alicyclic epoxy resin, a dicyclopentadiene epoxy resin, a phenol novolac epoxy resin, a polyester modified epoxy resin, and a silicone modified epoxy resin.

The curing agent may be an amine curing agent such as aliphatic amine, alicyclic amine, or aromatic amine, a polyamide curing agent, an acid anhydride curing agent such as phthalic anhydride, methyltetrahydrophthalic acid anhydride, endo-methylene-tetrahydrophthalic anhydride, methyl endo-methylene-tetrahydrophthalic anhydride, methylhexahydrophthalic anhydride, or trimellitic anhydride, or a latent hardener such as 1,3-bis(hydrazinocarboethyl)-5-isopropylhydantoin, eicosane diacid dihydrazide, adipic acid dihydrazide, dicyandiamide, or 7,11-octadecadiene-1,18-dicarbohydrazide.

The reactive diluent may be t-butylphenylglycidylether, 2-ethylhexylglycidylether, allylglycidylether, phenylglycidylether, or the like.

The curing accelerator may be a compound having one or more ester bonds resulting from the reaction between 1-alkoxy ethanol and carboxylic acid in a molecule, an imidazole compound such as 2-methylimidazole, 2-ethyl-4-methylimidazole, 2-undecylimidazole, or 2-phenylimidazole, carboxylic acids such as adipic acid, tertiary amine such as dimethylbenzylamine, quaternized ammonium salt such as tetrabutylammonium bromide, alkyl urea such as 3-(3',4'-dichlorophenyl)-1,1-dimethylurea, or the like.

The inorganic filler may be molten silica powder, quartz glass powder, crystalline glass powder, glass fiber, alumina powder, talc, aluminum powder, titanium oxide, or the like.

The cross-linked rubber particles may be made from a vulcanized acrylonitrile-butadiene rubber having a carboxyl group in a molecular chain or the like. Although there is no particular limitation on the particle size, the cross-linked rubber particles are preferably ultrafine particles with an average particle size of about 30 to 200 nm to render dispersibility and stable flexibility.

In addition, the surface of the fixed member 2 on which the thermoset resin adhesive A is dried and solidified, is preferably subjected to a roughening process or primer process from the viewpoint of improvement in an anchor effect on the thermoset resin adhesive A.

The roughening process may be performed by blast treatment, chemical etching, chemical conversion, hair-line finish, or the like.

The roughness of the application surface of the fixed member 2 having undergone the roughening process preferably falls within the range of Ra 0.5 to 2 µm.

The roughness of the application surface may be measured based on JIS B0601-1994.

The primer may be formed on the basis of silane, phenol, epoxy, or the like.

Next, referring to the enlarged vertical cross-sectional view of major components of FIG. 4, application ranges of the thermoset resin adhesive A to the annular fixed member 2 as an annular insert will be described.

FIGS. 4(a) and 4(b) show the cases where the adhesive A is applied to the entire joining surface of the annular fixed member 2 to the annular plastic magnet 3. In the example of FIG. 4(a), the adhesive A is applied in a range corresponding to boundaries B1 and B2 with the annular plastic magnet 3. In the example of FIG. 4(b), the adhesive A is applied to a range that goes beyond the one boundary B1 with the annular plastic magnet 3 by protruding length D and goes beyond the other boundary B2 by protruding length E.

FIGS. 4(c) and 4(d) show the cases where the adhesive A is applied to a surface F of the annular fixed member 2 axially opposed to the annular plastic magnet 3, which is joined to the annular plastic magnet 3. In the example of FIG. 4(c), the adhesive A is applied in a range corresponding to the boundary B1 with the annular plastic magnet 3. In the example of FIG. 4(d), the adhesive A is applied in a range that goes beyond the boundary B1 with the annular plastic magnet 3 by the protruding length D.

In each of the examples of FIGS. 4(a) to 4(d), the adhesive A is not applied to a portion C of the annular fixed member 2 to be fitted with the inner ring 12 as a rotating body (refer to FIGS. 1 and 2).

The protruding lengths D and E in the examples of FIGS. 4(b) and 4(d) are preferably set to be 3 mm or less to reduce waste of the adhesive and suppress contamination or the like of the transfer jig and metal mold.

Next, variations of joining forms of the annular fixed member 2 and the annular plastic magnet 3 and application ranges of the adhesive in the annular insert molded article 1 will be described with reference to the enlarged vertical cross-sectional views of major components of FIGS. 5 and 6 for the axial-type magnetic encoder 1A, and with reference to the enlarged vertical cross-sectional views of major components of FIGS. 7 and 8 for the radial-type magnetic encoder 1B.

In the example of the axial-type magnetic encoder 1A, the shapes of the annular fixed member 2 shown in FIGS. 5(c) to 5(f) and 6(a) to 6(d) are different from the shapes of the annular fixed member 2 shown in FIGS. 3 and 4.

First, for the axial-type magnetic encoder 1A, FIG. 5(a) shows a state where the wrap-around joint portion I is eliminated from the encoder shown in FIG. 3, FIG. 5(c) shows a state where the wrap-around joint portion I is provided at an inner peripheral edge side of the flange part 2B of the annular fixed member 2, FIG. 5(e) shows a state where the joint portion H resulting from molding shrinkage and the wrap-around joint portion I are added as in the encoder shown in FIG. 3 and a resin lock portion is provided at the inner peripheral edge side of the flange part 2B, FIG. 6(a) shows a state where the wrap-around joint portion I is provided at the inner peripheral edge side of the flange part 2B, and FIG. 6(c) shows a state where the joint portion H resulting from molding shrinkage is provided at an outer peripheral edge side of the flange part 2B and the wrap-around joint portion I is provided at the inner peripheral edge side of the flange part 2B.

With regard to the application ranges of the adhesive A to the annular fixed member 2 in the magnetic encoder 1A of FIGS. 5(a), 5(c), 5(e), 6(a), and 6(c), the adhesive A is applied in ranges corresponding to the boundary with the annular plastic magnet 3 as shown in FIG. 5(b), 5(d), 5(f), 6(*b*), and 6(*d*) (refer to J1 to J5), respectively, and the adhesive A is not applied to the portion C of the annular fixed member 2 to be fitted with the inner ring 12 as a rotating body (refer to FIGS. 1 and 2).

As in the axial-type magnetic encoder 1A shown in FIGS. 4(*b*) and 4(*d*), the adhesive A in the axial-type magnetic encoder 1A shown in FIGS. 5 and 6 may be applied to the annular fixed member 2 in ranges not going beyond the boundary with the annular plastic magnet 3 by more than 3 mm.

In the radial-type magnetic encoder 1B, the joint portion H resulting from molding shrinkage is provided as shown in FIGS. 7(*a*) and 7(*c*). When injection molding is performed with the annular fixed member 2 inserted, the resin is likely to shrink at the inner diameter side. However, the shrinkage is controlled by the outer peripheral surface of the steel cylindrical part 2A to generate stress (force of tightening the cylindrical part 2A by the resin) to join together the annular fixed member 2 and the annular plastic magnet 3. Accordingly, the joint portion H resulting from molding shrinkage is shown in a joined state.

FIG. 7(*a*) shows a state where the surface of the flange part 2B of the annular fixed member 2 is covered with resin, and FIG. 7(*c*) shows a state where the surface of the flange part 2B of the annular fixed member 2 is not covered with resin.

In the radial-type magnetic encoder 1B, a sensor is arranged on the radially outside of the annular plastic magnet 3 to detect rotation of the magnetic encoder 1B opposed to the magnetic pole of the magnetic encoder 1B.

With regard to application ranges of the adhesive A to the annular fixed member 2 in the magnetic encoder 1B shown in FIGS. 7(*a*) and 7(*c*), the adhesive A is applied in ranges corresponding to the boundary with the annular plastic magnet 3 as shown in FIGS. 7(*b*) and 7(*d*) (refer to J6 and J7), respectively, and the adhesive A is not applied to the portion C of the annular fixed member 2 to be fitted with the outer ring as a rotating body.

As in the axial-type magnetic encoder 1A shown in FIGS. 4(*b*) and 4(*d*), the adhesive A in the radial-type magnetic encoder 1B shown in FIG. 7 may be applied to the annular fixed member 2 in a range not going beyond the boundary with the annular plastic magnet 3 by more than 3 mm.

In the radial-type magnetic encoder 1B shown in FIG. 7(*a*), the adhesive A may be applied to the entire joining surface of the annular fixed member 2 to the annular plastic magnet 3 as shown in FIG. 8(*a*), or the adhesive A may be applied only to the radially opposed surface G of the annular fixed member 2 as shown in FIG. 8(*b*).

Next, descriptions will be given as to application method of the adhesive A in an adhesive application step of applying the thermoset resin adhesive A to the annular fixed member 2 as an annular insert.

The application of the adhesive A to the annular fixed member 2 in the foregoing application range cannot be performed by soaking the annular fixed member 2 in the liquid adhesive stored in a bath or spraying the adhesive onto the annular fixed member 2.

The application of the adhesive A in the application range can be performed by a pad printing process by which a pad as a transfer body with the adhesive A in a predetermined region is pressed against the annular fixed member 2 to transfer the adhesive A to the annular fixed member 2, a screen printing process by which the adhesive A is placed on a screen printing plate with pores in a predetermined region and is extruded through the pores to transfer the adhesive A to the annular fixed member 2, or a brushing process.

According to such application methods, the application of the adhesive A can be performed stably and reliably in the adhesive application step such that the thermoset resin adhesive A is applied to the annular fixed member 2 only in a range not going beyond the boundary with the annular plastic magnet 3 by more than 3 mm and the adhesive A is not applied to the portion C of the annular fixed member 2 to be fitted with the rotating body.

As described above, when the thickness of the adhesive A is 2 to 20 µm, the necessary adhesion strength can be maintained even if the magnetic encoder is used under severe environments. However, as the application thickness of the adhesive A becomes larger, contamination of the transfer jig and the metal mold by the adhesive and generation of foreign matter due to separation of the adhesive may occur very frequently with conventional application methods (for example, the adhesive is repeatedly applied by soaking with no limitation on the application range unlike in the present invention).

The manufacturing method of the annular insert molded article 1 (for example, the axial-type magnetic encoder 1A or the radial-type magnetic encoder 1B) according to the embodiment of the present invention includes a drying and solidification step, an injection molding step, and a thermal curing step, described later, which are performed after the adhesive application step, but does not include a heating step of heating and baking an adhesive into a semi-cured state as described in Patent Document 1, between the adhesive application step and the injection molding step.

Next, details of the drying and solidification step to be performed after the adhesive application step will be described.

Thermoset adhesives have the property of, when being heated, initiating a cross-linking reaction and starting to be cured. In the present invention, therefore, the temperature at which the thermoset resin adhesive A initiates a cross-linking reaction and starts to be cured will be referred to as "cross-linking reaction starting temperature."

The "drying and solidification" means that an organic solvent included in the thermoset resin adhesive A is evaporated at the time of application of the thermoset resin adhesive A to the annular fixed member 2 in the adhesive application step to solidify a solid content of the thermoset resin adhesive A.

At the drying and solidification step, the annular fixed member 2 to which the thermoset resin adhesive A is applied in the application range is processed such that the solvent included in the adhesive A is evaporated at a temperature lower than the cross-linking reaction starting temperature of the adhesive A to dry and solidify the adhesive A.

The degree of evaporation of the organic solvent in the drying and solidification step may be a degree that, when the surface of the applied thermoset resin adhesive A is touched directly by fingers, the thermoset resin adhesive A does not stick to the fingers. Alternatively, the thermoset resin adhesive A may be dried and solidified to a degree that organic solvent hardly remains. Accordingly, there is no particular limitation on the degree of evaporation of the organic solvent. From the viewpoint of ease of adhesion to the annular plastic magnet 3 in particular, the thermoset resin adhesive A is preferably dried and solidified to the degree that the organic solvent hardly remains.

The temperature for the drying and solidification step needs to be lower than the cross-linking reaction starting temperature of the thermoset resin adhesive A, and, specifically, may be decided as appropriate depending on the kind of the thermoset resin adhesive A to be used. For example, from the viewpoint of drying and solidifying the thermoset resin adhesive A in a short time regardless of the kind of the thermoset resin adhesive A to be used, the temperature is desirably adjusted to lower than 110° C. and more preferably between 25 to 105° C.

The drying and solidification may be performed with stepwise temperature increases from a predetermined temperature, from the viewpoint of efficiently drying and solidifying the thermoset resin adhesive A.

In this case, there is no particular limitation on a difference between the first temperature and the second temperature.

As a means for the drying and solidification, for example, there are methods including: a method by which to blow a gas adjusted to a predetermined temperature onto the surface of the thermoset resin adhesive A applied to the annular fixed member 2; a method by which to let the annular fixed member 2 with the thermoset resin adhesive A stand still in a room adjusted to a predetermined temperature; and a method by which to let the annular fixed member 2 stand still at a predetermined temperature under reduced-pressure environments. These methods may be used in combination.

Next, details of the injection molding step to be performed after the drying and solidification step will be described.

The annular fixed member 2 as an annular insert having undergone the drying and solidification step is set in a metal mold, and a dissolved plastic magnet material is injected into the metal mold.

There is no particular limitation on temperature of the dissolved plastic magnet material as far as the plastic has a viscosity allowing injection and is adjusted to a temperature not causing solidification. For example, the temperature may be 200 to 360° C.

There is no particular limitation on the magnetic substance powder as the plastic magnet material as far as the material is magnetic substance powder as used in a plastic magnet part of a commercially available magnetic encoder manufactured by insert molding. For example, ferrite magnetic powder such as strontium ferrite or barium ferrite, and rare-earth magnetic powder such as neodymium- or samarium-based magnetic powder are preferably used. In addition, lanthanum and cobalt or the like may be mixed into the magnetic substance powder for improvement of magnetic characteristics of ferrite, or part of ferrite may be replaced with rare-earth magnetic powder such as neodymium-ferrite-boron, samarium-cobalt, or samarium-ferrite powder.

Thermoplastic resins used preferably as a plastic magnet material are polyamides (PA6, PA12, PA612, and the like), polyphenylene sulfide (PPS), or the like, for example. There is no limitation on physical properties such as melting point and bending elastic modulus of the thermoplastic resin.

The additive as a plastic magnet material is preferably a specific plasticizer of at least one kind selected from an organic additive such as carbon fiber, an inorganic additive such as glass beads, glass fiber, talc, mica, silicon nitride (ceramic), or crystalline (or non-crystalline) silica, benzenesulfonic acid alkylamides, toluenesulfonic acid alkylamides, and hydroxybenzoic acid alkyl esters, and the like.

The contents of the thermoplastic resin, magnetic substance powder, additive, and the like of the plastic magnet part may be the same as those of a plastic magnet part of a commercially available magnetic encoder. There is no limitation on the contents.

Next, details of the heat curing step to be performed after the injection molding step will be described.

The annular insert molded article 1 having undergone the injection molding step is taken out of the metal mold, and is processed in a heat curing step at the cross-linking reaction starting temperature of the thermoset resin adhesive A or a higher temperature.

In this step, the heat curing process is performed at the cross-linking reaction starting temperature or a higher temperature to cause a cross-linking reaction in the thermoset resin adhesive A intervening between the annular fixed member 2 and the annular plastic magnet 3.

The cross-linking reaction starting temperature or a higher temperature falls within the range of 110 to 180° C. in which a cross-linking reaction can be caused to bring about a curing reaction, regardless of the kind of the resin used in the adhesive.

The heat curing process may be performed with stepwise temperature increases. For example, the first temperature may be set to 110 to 140° C., and the second temperature to 140 to 180° C. The upper limit for the cross-linking reaction starting temperature or a higher temperature may exceed 180° C. from the viewpoint of shortening the processing time.

The annular plastic magnet 3 is circumferentially magnetized in a multipolar manner. The magnetization may be carried out such that injection molding is performed in an adjusted magnetic field in the injection molding step to orientate the magnetic powder in the magnetic field, or the magnetic encoder having undergone the heat curing step is demagnetized and then a separately prepared magnetization device such as a magnetization yoke is used to magnetize the magnetic encoder in a multipolar manner such that N and S poles are alternate in the circumferential direction of the annular plastic magnet 3.

Next, descriptions will be given as to a test example that was carried out to investigate influences of drying temperatures on separation strength of the thermoset resin adhesive A between the annular fixed member 2 and the annular plastic magnet 3 in the annular insert molded article 1.

(Test Example)

First, an SUS430 metal plate for a fixing member was processed to fabricate a fixed member plate 16 (25 mm wide, 80 mm long, and 2 mm thick) shown in the schematic perspective view of FIG. 9.

The phenol thermoset resin adhesive A was applied to the surface of one end of the fixed member plate 16 with a width of about 10 mm relative to a length direction K. Then, the fixed member plate 16 was let stand still for 30 or 60 minutes in a reaction container at different temperatures of 25° C., 60° C., 90° C., 105° C., 120° C., and 150° C. to dry and completely eliminate organic solvents (methyl ethyl ketone, methyl isobutyl ketone, and methanol) in the adhesive A and form a thermoset resin adhesive layer 19.

Then, the fixed member plate 16 was set in a predetermined metal mold for insert molding, and a plastic magnet material (basic ingredients: PA12+strontium ferrite powder) dissolved at a temperature 270° C. was injected into the metal mold to form a plastic magnet plate 17 almost the same in shape as the fixed member plate 16 shown in FIG. 9.

Then, the plastic magnet plate 17 was subjected to a heat curing process at a temperature of 150° C., which is higher than the cross-linking reaction starting temperature, to cause a cross-linking reaction in the thermoset resin adhesive layer 19 to bring about a curing reaction, thereby obtaining a dumbbell specimen 4 for evaluation of adhesion strength shown in FIG. 9. No magnetization was carried out.

The obtained dumbbell specimen 4 for evaluation of adhesion strength was subjected to tensile shear testing at which the specimen was pulled out by a precision universal tester 18 toward both ends under test conditions of JISK6850 to examine the force by which the thermoset resin adhesive layer 19 was fractured. FIG. 10 shows measurement results of separation strengths. The separation strengths in FIG. 10 are given scores with the separation strength at a drying temperature of 120° C. and for a drying time of 30 minutes regarded as 100. FIG. 10 also shows deviations indicative of variations in separation strength with differences in drying time by a two-dot chain line.

The process for fabricating the dumbbell specimen 4 for evaluation of adhesion strength is in accordance with the manufacturing method of the annular insert molded article 1 in the present invention. Therefore, each of the obtained separation strengths is considered to be equivalent to the separation strength of the annular insert molded article 1 in the present invention fabricated in the same manner.

From the results in FIG. 10, it has been confirmed that the separation strength started to be lower at drying temperatures exceeding about 105° C., and become significantly lowered at temperatures around 120° C.

Such reduction in adhesion strength was a new, previously unknown event. Thus, the inventor of the present invention has further examined the cause of the reduction in adhesion strength, and has revealed that the adhesion strength become lower at a temperature of 150° C. to the degree that no adhesion was provided. The inventor has thus noticed that, at higher drying temperatures, the adhesive used may causes a curing reaction and decreases reaction groups, which result in insufficient joining with the thermoplastic resin as a material for the plastic magnet.

Therefore, the phenol thermoset resin adhesive A applied to the surface of the annular fixed member 2 was baked under a drying temperature condition: 1) air-drying at a room temperature; 2) 10-minute drying at 90° C.; or 3) 10-minute drying at 150° C., thereby to examine whether the adhesive A could be removed by a methyl ethyl ketone (MEK) solvent. Although the adhesive A is generally dissolved in the MEK solvent, the adhesive A modified due to a cross-linking reaction resulting from heat curing is not dissolved in the MEK solvent. Accordingly, it is possible to determine whether the adhesive A is thermally cured depending on whether the adhesive A can be removed by the MEK solvent.

As the result, the adhesive A could be removed by the MEK solvent from the air-dried article and the 90° C.-dried article. Meanwhile, the adhesive A could not be removed by the MEK solvent from the 150° C.-dried article, and thus the adhesive A on the 150° C.-dried article is considered to have been already cured. The adhesive A on the 150° C.-dried article is considered to have not been fully cured but semi-cured due to a short processing time.

From the foregoing matter, it is assumed that the decrease in separation strength from about 105° C. was caused by the thermal curing of the thermoset resin adhesive A applied to the surface of the fixed member 2 at the time of drying.

In actuality, from the results in FIG. 10, the separation strengths of the magnetic encoder obtained by drying at temperatures of 25 to 105° C. are higher by about 1.7 to 1.9 times than those of the magnetic encoder obtained by drying at a temperature of 120° C. regardless of the processing time, which means significant improvement in joining strength of the adhesive.

In the case of drying at temperatures of 25 to 105° C., there is an advantage that working stability is improved even in high-volume processing due to the lower temperatures as compared to the case where the drying temperature is adjusted to as high a temperature as 120° C. or the like.

From the results in FIG. 10, it can be understood that, as the drying temperature becomes higher than 105° C., the deviations in separation strength become larger, which means that the influence of changes in strength depending on the drying temperatures becomes larger.

Specifically, in the 120° C. process, the value of the deviation is higher by about five times as compared to the 60° C. process. This means that, as the temperature is higher, the cross-linking curing reaction becomes more active and the curing reaction state changes significantly relative to the drying time.

That is, drying at as high a temperature as 120° C. contributes to improvement in productivity such as shortening of the processing time. Meanwhile, in the case of high-temperature drying, it is difficult to control the drying temperature and the drying time, and the adhesion strength of products has inevitably large variations due to unevenness of temperature in drying equipment at the time of high-volume processing and differences in loading and unloading timings relative to the drying equipment.

In contrast, it can be understood that setting the drying temperature to be lower than the cross-linking reaction starting temperature of the thermoset resin adhesive A such as 25 to 105° C. significantly suppresses variations in the adhesion strength of products in a process batch or in each of process batches at the time of high-volume processing.

According to the annular insert molded article 1 and the manufacturing method of the annular insert molded article 1 as described above, the application range of the adhesive to the annular fixed member 2 as an annular insert does not go beyond the boundaries B1 and B2 with the annular plastic magnet 3 by more than 3 mm, which makes it possible to suppress contamination of the transfer jig by the adhesive A when the annular fixed member 2 having undergone the adhesive drying step is transferred by automated machinery, and suppress contamination of the metal mold and generation of foreign matter by the adhesive A when the annular fixed member 2 is set in the metal mold or the injection forming step is performed.

In addition, the application range of the adhesive A to the annular insert 2 does not go beyond the boundaries B1 and B2 with the annular plastic magnet 3 by more than 3 mm, and thus the adhesive A is applied to a small region of the annular insert 2 to be in contact with the metal mold in the injection molding step, which brings about light adhesion between the annular insert 2 and the metal mold, even though a primary heating step in which to heat and bake the adhesive A into a semi-cured state is not performed before the injection molding step. Therefore, the annular insert molded article 1 is not hard to separate from the metal mold, without reduction in productivity.

Further, the application range of the adhesive A to the annular fixed member 2 does not include the portion C of the annular fixed member 2 to be fitted with a rotating body, and thus when the annular insert molded article 1 is attached to the rotating body, the adhesive A does not peel off from the annular fixed member 2 or remain as foreign matter in the rotating body.

Moreover, according to the configuration in which the annular insert molded article 1 is the axial-type magnetic encoder 1A and the adhesive A is applied only to the axially opposed surface F of the annular fixed member 2, or the configuration in which the annular insert molded article 1 is the radial-type magnetic encoder 1B and the adhesive A is applied only to the radially opposed surface G of the annular fixed member 2, it is possible to improve workability and productivity of the adhesive application step because of one-direction application of the adhesive A and allow the plastic magnet 3 with magnetic poles formed along the axially opposed surface F or the radially opposed surface G of the fixed member 2 to adhere effectively to the fixed member 2.

In addition, the application range of the thermoset resin adhesive A to the annular fixed member 2 does not go beyond the boundaries B1 and B2 with the annular plastic magnet 3 by more than 3 mm, and therefore a smaller amount of the adhesive A is applied to unnecessary portions to reduce waste of the adhesive A to an extremely amount, thereby retarding increase of material costs for the adhesive A.

According to the manufacturing method of the annular insert molded article 1 including the drying and solidification step of volatilizing a solvent included in the adhesive A under a temperature condition at a temperature lower than the cross-linking reaction starting temperature of the adhesive A to dry and solidify the adhesive A between the adhesive application step and the injection molding step, and not including the heating step of heating the adhesive A at a temperature higher than the cross-linking reaction starting temperature of the adhesive A to bake the adhesive A onto the annular fixed member 2, the reactive groups in the adhesive A to be linked with the dissolved plastic magnet material does not decrease in the injection molding step, and the binding force between the annular fixed member 2 and the annular plastic magnet 3 does not decline. Therefore, the adhesion strength of the adhesive A becomes higher.

In the foregoing description, the annular insert molded article 1 in the present invention is the axial-type magnetic encoder 1A or the radial-type magnetic encoder 1B. However, the annular insert molded article 1 in the present invention is not limited to them. The annular insert molded article 1 in the present invention may be any annular insert molded article instead of a metal article or the like as far as the insert molded article is manufactured by injection molding in a state where the thermoset resin adhesive A is applied to the joining surface of an annular insert to an annular plastic, and the annular insert and the annular plastic are placed in a metal mold.

REFERENCE SIGNS LIST

1 Annular insert molded article
1A Axial-type magnetic encoder
1B Radial-type magnetic encoder
2 Annular fixed member (annular insert)
2A Cylindrical part
2B Flange part
3 Annular plastic magnet (annular plastic)
4 Dumbbell specimen for evaluation of adhesion strength
5 Protective cover
6 First cylindrical part
7 Second cylindrical part
8 Annular part
9 Seal body
10 Sensor
11 Bearing device
12 Inner ring (rotating body)
12A Inner ring track surface
13 Outer ring
13A Outer ring track surface
14 Rolling element
15 Seal member
16 Fixed member plate
17 Plastic magnet plate
18 Precision universal tester
19 Thermoset resin adhesive layer
A Thermoset resin adhesive
B1, B2 Boundary
C Portion to be fitted with a rotating body
D, E Protruding length
F Axially opposed surface
G Radially opposed surface
H Joint portion resulting from molding shrinkage
I Wrap-around joint portion
J1 to J7 Application range of adhesive
K Length direction

The invention claimed is:

1. A manufacturing method of an annular insert molded article, comprising:
   applying a thermoset resin adhesive to a joining surface of an annular insert and an annular plastic, wherein the annular insert is attachable to a rotating body, wherein the thermoset resin adhesive is applied to the annular insert only in a range not going beyond a boundary with the annular plastic by more than 3 mm, and the thermoset resin adhesive is not applied to a portion of the annular insert to be fitted with the rotating body;
   completely volatizing a solvent included in the thermoset resin adhesive under a temperature condition at a temperature lower than a cross-linking reaction starting temperature of the thermoset resin adhesive to dry and solidify the thermoset resin adhesive; and
   injecting a dissolved plastic material into a metal mold in which the annular insert having undergone the adhesive application step is placed, wherein
   the manufacturing method does not include a heating step of heating the thermoset resin adhesive into a semi-cured state to bake the thermoset resin adhesive in the semi-cured state onto the annular insert between the adhesive application step and the injection molding step.

2. The manufacturing method of an annular insert molded article according to claim 1, wherein
   the annular insert molded article is an axial-type magnetic encoder that has the annular insert as a fixed member and the annular plastic as a plastic magnet, and
   the thermoset resin adhesive is applied only to an axially opposed surface of the fixed member in the adhesive application step.

3. The manufacturing method of an annular insert molded article according to claim 1, wherein
   the annular insert molded article is a radial-type magnetic encoder that has the annular insert as a fixed member and the annular plastic as a plastic magnet, and
   the thermoset resin adhesive is applied only to a radially opposed surface of the fixed member in the adhesive application step.

4. The manufacturing method of an annular insert molded article according to claim 1, wherein the thermoset resin adhesive is applied to the annular insert by a pad printing process in which a pad as a transfer body with the thermoset resin adhesive in a predetermined region is pressed to transfer the thermoset resin adhesive to the annular insert, or by a screen printing process in which the thermoset resin adhesive is placed on a screen printing plate with pores in a predetermined range and is extruded from the pores to transfer the thermoset resin adhesive to the annular insert.

* * * * *